(12) United States Patent
Lee

(10) Patent No.: US 8,714,438 B2
(45) Date of Patent: May 6, 2014

(54) METHOD FOR INTERACTIVE FALSE CHECKING OF A PRODUCT BY USING COLORED 2 DIMENSIONAL BAR CODES AND A SYSTEM FOR PERFORMING THE SAME

(76) Inventor: Juichin Lee, Taipei (TW)

( * ) Notice: Subject to any disclaimer, the term of this patent is extended or adjusted under 35 U.S.C. 154(b) by 0 days.

(21) Appl. No.: 12/938,358

(22) Filed: Nov. 2, 2010

(65) Prior Publication Data

US 2012/0104086 A1     May 3, 2012

(51) Int. Cl.
    *G06F 17/00*     (2006.01)
(52) U.S. Cl.
    USPC ........................................ 235/375; 235/462.04
(58) Field of Classification Search
    USPC ................ 235/462.04, 462.09, 494, 375
    See application file for complete search history.

(56) References Cited

U.S. PATENT DOCUMENTS 7,830,277 B2 *    11/2010    Lee ................................ 340/999

* cited by examiner

Primary Examiner — Karl D Frech

(57) ABSTRACT

A method for interactive false checking of a product by using colored 2 dimensional bar codes comprises the steps of (a) generating a unique colored forgery-proof bar code 40, a fixed data 41 and a 2D variable bar code 42 by inputting a product related data and generating a database in the auto-bi-directional comparison and the responding system 6; (b) printing a colored 2D variable bar code containing the product data by a digital printing device; (c) printing the colored 2D variable bar code on a tag; (d) a consumer scanning the 2 dimensional variable bar code so as to get the product data which transferred to the system for comparison; (e) after comparison, a comparison result being transferred to the consumer's handset; and (f) the phone numbers of the phone or handset of the consumer for future using. A system for performing the same is also provided.

1 Claim, 4 Drawing Sheets

METHOD FOR INTERACTIVE FALSE CHECKING OF A PRODUCT BY USING COLORED 2 DIMENSIONAL BAR CODES AND A SYSTEM FOR PERFORMING THE SAME

FIELD OF THE INVENTION

The present invention relates to 2D bar codes, in particular to a method for interactive false checking of a product by using colored 2 dimensional bar codes and the system for performing the same.

BACKGROUND OF THE INVENTION

2D BAR CODEs are widely used in many fields and many improvement inventions are disclosed, such as those disclosed in U.S. Patent No. 2005/0087604A1 and US200820100. However, these prior arts have the following defects.

A driver is used to actuate a chip for generating a variable code and a first and a second verification code and a figure code. However, power is needed to supply to the driver and the chip.

A driver is used to actuate a chip for generating a variable code and a first and a second verification code and a figure code. The cost is higher than general used 2D bar code. Thus it is impractical.

In use, the driver 12 must be actuated firstly and then the chip will generate a variable value for generating the first and second verification codes so as to generate the figure code (that is the 2D bar code). Then the figure code is scanned by an electronic device for identification by an identifier. The process is tedious and time consumed.

A certain device is used to connect the code generator and an object so that after release, the generator will be inactive for other object not registered by the generator. Thus the structure of the generator is complicated so as to dramatically increase the cost.

The prior art only has the function of identification without other functions, such as references to consumers and buyers.

SUMMARY OF THE INVENTION

The object of the present invention is to provide a method for interactive false checking of a product by using colored 2 dimensional bar codes and the system for performing the same. The present invention has a lower cost so that it can be used widely. Furthermore, in the present invention, the bar code is combined with colors so that other than all the digits must be matched and the color must be also matched. Thereby, in the present invention, the auto-bi-directional comparison and the responding system 6 will store the consumer's phone numbers for future use.

The primary object of the present invention is to provide a method for interactive false checking of a product by using colored 2 dimensional bar codes, comprising the steps of (a) generating a unique colored forgery-proof bar code 40, a fixed data 41 and a 2D variable bar code 42 by inputting a product resource (manufacturer), a product menu, a variable series number, an official network address, phone numbers by the 2 dimensional variable bar code generator 4; and meanwhile generating a database in the auto-bi-directional comparison and the responding system 6; (b) printing a colored 2D variable bar code containing the product resource (manufacturer), the product menu, the variable series number, the official network address, phone numbers by a digital printing device; (c) printing the colored 2D variable bar code on a tag; (d) a consumer scanning the 2 dimensional variable bar code by a handset or calling a predetermined phone number provided by the manufacturer by a consumer phone so as to get the product menu, the variable series number, the official network address, phone numbers; these data being transferred to the auto-bi-directional comparison and the responding system 6 for comparison; (e) after comparison, a comparison result being transferred to the consumer's handset; and (f) the auto-bi-directional comparison and the responding system 6 storing phone numbers of the phone or handset of the consumer for future using such as providing new product menu or new message to the consumer.

The present invention also includes the device for performing the method.

The various objects and advantages of the present invention will be more readily understood from the following detailed description when read in conjunction with the appended drawing.

DETAILED DESCRIPTION OF THE INVENTION

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
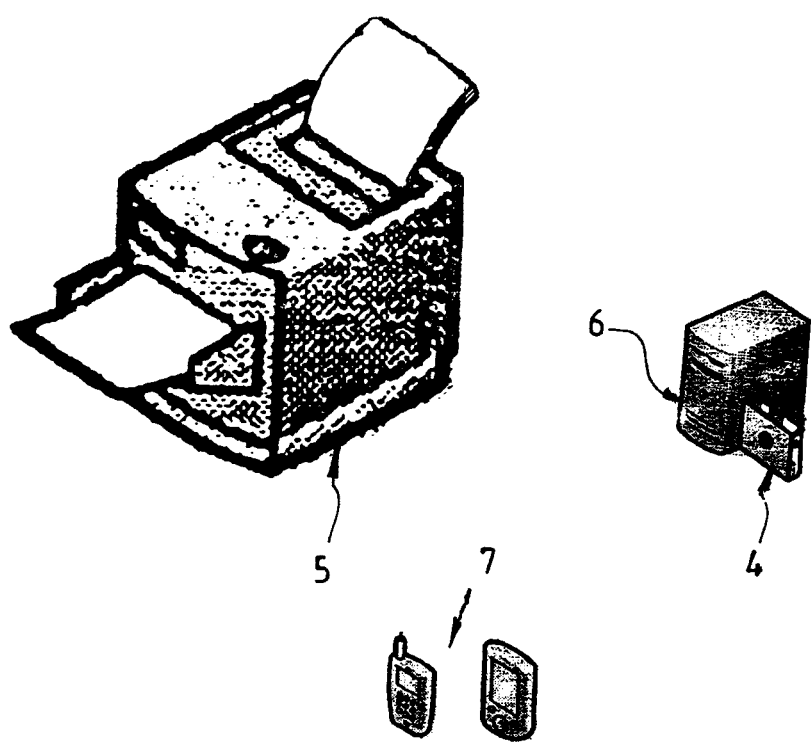
FIG. 1 is a schematic view showing the element of the present invention.

The structure of the present invention is illustrated. The present invention comprises the following elements with reference to FIGS. 1 to 3.

A 2 dimensional variable bar code generator 4 contains a software which has the function of generate an unique colored forgery-proof bar code 40, invariable data 41, and 2D variable bar code 42 for comparison and identification by an auto-bi-directional comparison and the responding system 6.

Figure 2:
FIG. 2 is a schematic view showing the colored 2 dimensional variable bar code according to the present invention.

A digital printing device 5 serves to print the colored forgery-proof bar code 40, invariable data 41, and 2D variable bar code 42 on a tag of an object. The colored forgery-proof bar code 40 includes two sets of identification data, which are a colored area 400 and a variable series number 401 which are overlapped, but the colored area 400 is overlapped on the variable series number 401. In FIG. 2, the different numbers of the variable series number 401 are presented by different colors, for example, the series number 0 is presented by black color; the series number 1 is presented by green color, the series number 3 is presented by yellow color; the series number 4 is presented by light blue color; the series number 5 is presented by brown color; the series number 8 is presented by deep blur color; the series number 7 is presented by purple color; the series number 6 is presented by red color; the series number 2 is presented by orange color and the series number 9 is presented by black color. Also, the invariable data 41 is displayed, such as the short message auto-comparison system: 0936076658. Thus a triple protection function is provided by comparing the colored area 400 on areas of the 2D variable bar code 42 and the colored forgery-proof bar code 40, the colored area 400 on the area of the variable series number area 401, the colored area and the variable series numbers in the database of the auto-bi-directional comparison and the responding system 6, and the colors and data in the official website. Thus if at least one of the series number and a position of the series number is not matched to those in the database of the auto-bi-directional comparison and the responding system 6, it can assure that the product is a forgery. On the contrary, the product is a true product and thus it can be used safely.

Figure 3:
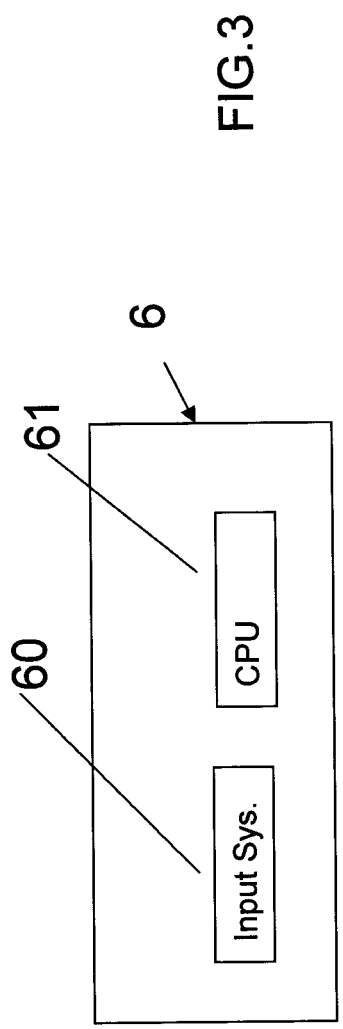
FIG. 3 is a schematic view showing the system of the present invention.
Figure 4:
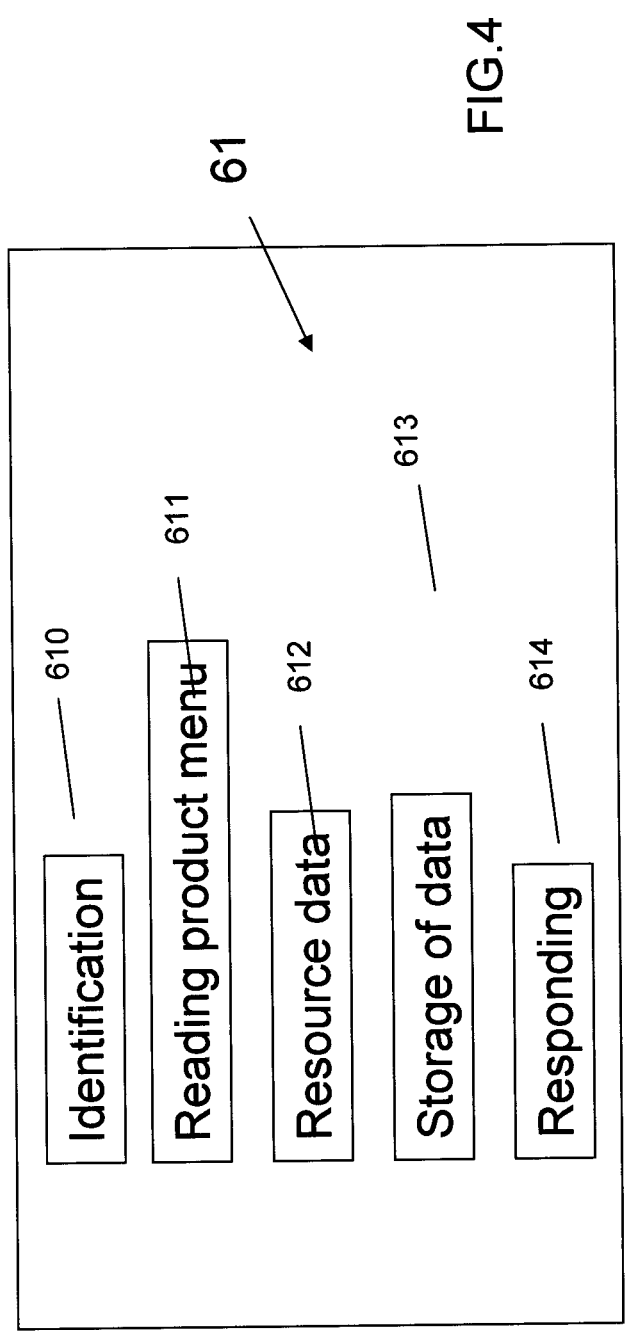
FIG. 4 shows the structure of the auto-bi-directional comparison and the responding system of the present invention.

In the present invention, the auto-bi-directional comparison and the responding system 6 is a combination of a database auto-comparison and network communication system so that the consumer can check the false or true of the commodity and the checking data can be stored for being used afterwards. Referring to FIG. 3, the input system is mainly formed by an input system 60 and a CPU 61. The CPU 61 serves for identifying the product to be a true one or a false one and for reading the product manual 611 and the data resource 612, storing the checking data 613 and response the system 614 as illustrated in FIG. 4. The result can be transferred to the handset 7 of the user through the responding system 614 so that the false or true of the product can be identified and the consumer can know the product. Meanwhile, the messages of new products or current products can be transferred to the consumer's handsets 7 through networks.

The handset or phone 7 is one with the function of image capturing. The image from the handset 7 (or phone) can be transferred to the auto-bi-directional comparison and the responding system 6, The phone number on the tag and the variable series number 41 on the colored forgery-proof bar code 40 are transferred by a handset to the auto-bi-directional comparison and the responding system 6 for determining the false or true of the product.

Figure 5:
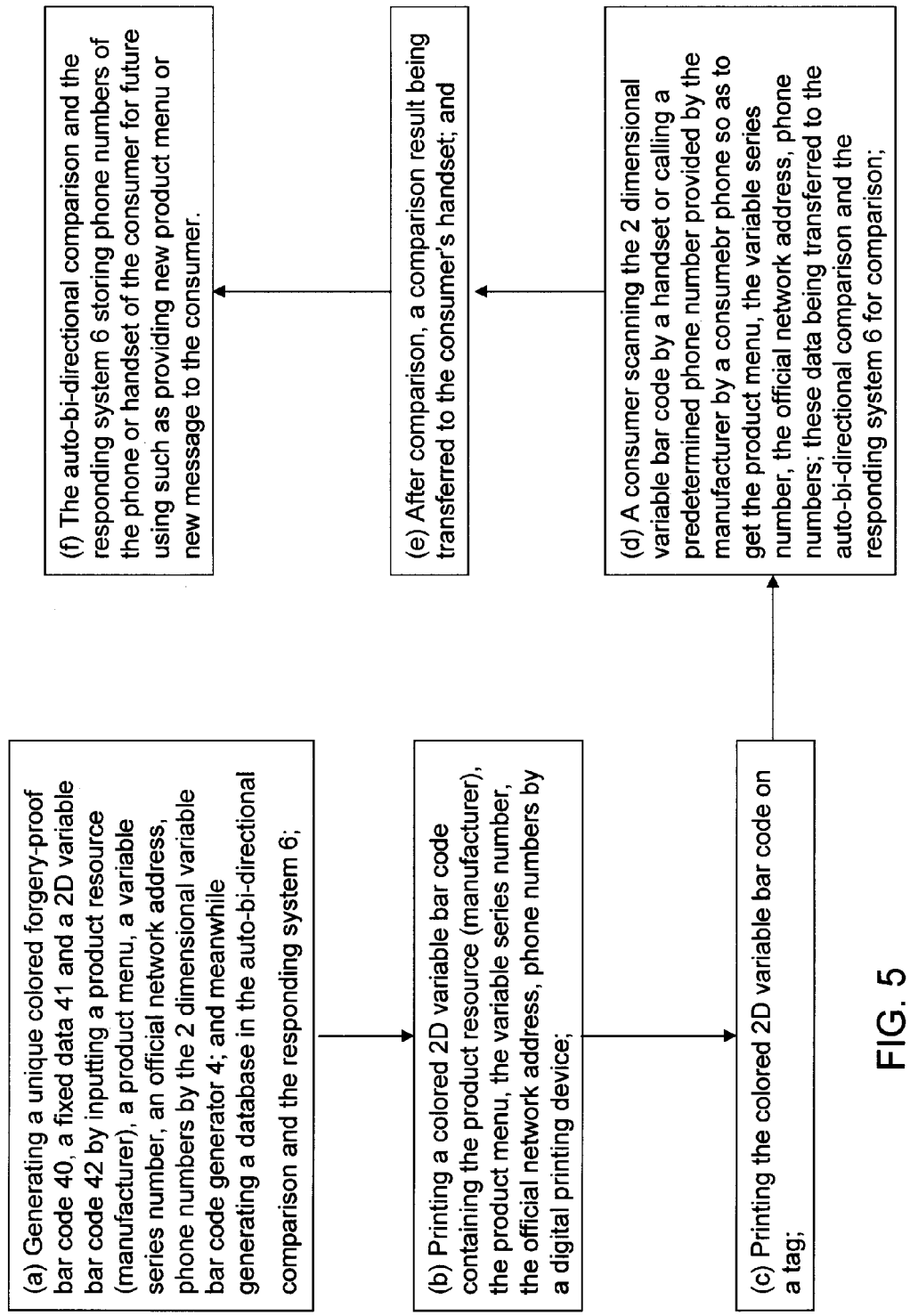
FIG. 5 shows the process of the present invention.

With reference to FIG. 5, the process of the present invention is illustrated therein. The process comprising the process of (a) generating a unique colored forgery-proof bar code 40, a fixed data 41 and a 2D variable bar code 42 by inputting a product resource (manufacturer), a product menu, a variable series number, an official network address, phone numbers by the 2 dimensional variable bar code generator 4; and meanwhile generating a database in the auto-bi-directional comparison and the responding system 6; (b) printing a colored 2D variable bar code containing the product resource (manufacturer), the product menu, the variable series number, the official network address, phone numbers by a digital printing device; (c) printing the colored 2D variable bar code on a tag; (d) a consumer scanning the 2 dimensional variable bar code by a handset or calling a predetermined phone number provided by the manufacturer by a consumebr phone so as to get the product menu, the variable series number, the official network address, phone numbers; these data being transferred to the auto-bi-directional comparison and the responding system 6 for comparison; (e) After comparison, a comparison result being transferred to the consumer's handset; and (f) the auto-bi-directional comparison and the responding system 6 storing phone numbers of the phone or handset of the consumer for future using such as providing new product menu or new message to the consumer.

The advantages of the present invention will be discussed in the following. The present invention has a lower cost so that it can be used widely. Furthermore, in the present invention, the bar code is combined with colors so that other than all the digits must be matched and the color must be also matched. Thereby, in the present invention, the auto-bi-directional comparison and the responding system 6 will store the consumer's phone numbers for future use.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for interactive false checking of a product by using colored 2 dimensional bar codes, comprising the steps of
   (a) generating a unique colored forgery-proof bar code, a fixed data and a 2D variable bar code for a product, and generating a database in a computing system;
   (b) generating a colored 2D variable bar code by a digital printing device;
   (c) printing the colored 2D variable bar code on a tag;
   (d) a consumer scanning the 2D variable bar code by a handset to get information of the product, and sending the information to the computing system;
   (e) transferring a comparison result to the consumer's handset; and
   (f) the computing system storing a phone number of the handset of the consumer for future using.

* * * * *